INVENTOR
JOHN J. SERRELL
BY Archibald Cox
ATTORNEY

July 26, 1932.  J. J. SERRELL  1,868,544
FLEXIBLE COUPLING
Filed Nov. 26, 1930    3 Sheets-Sheet 2
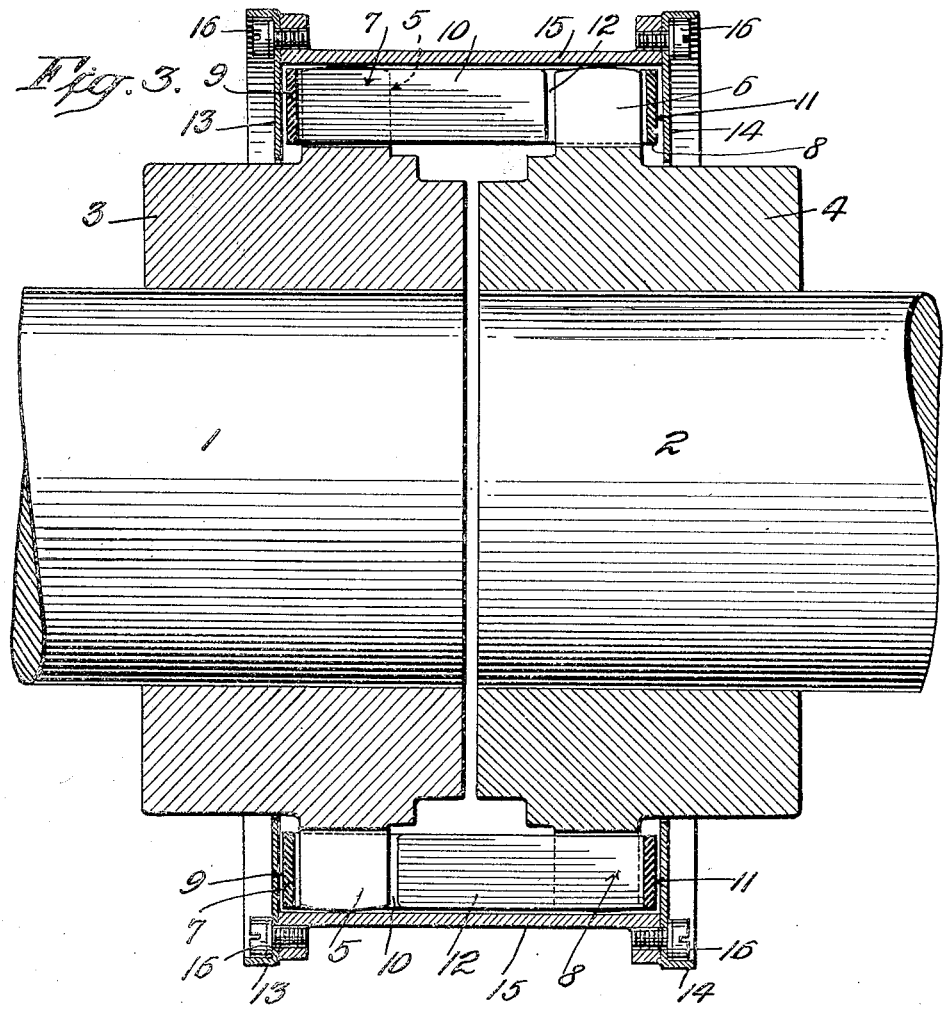
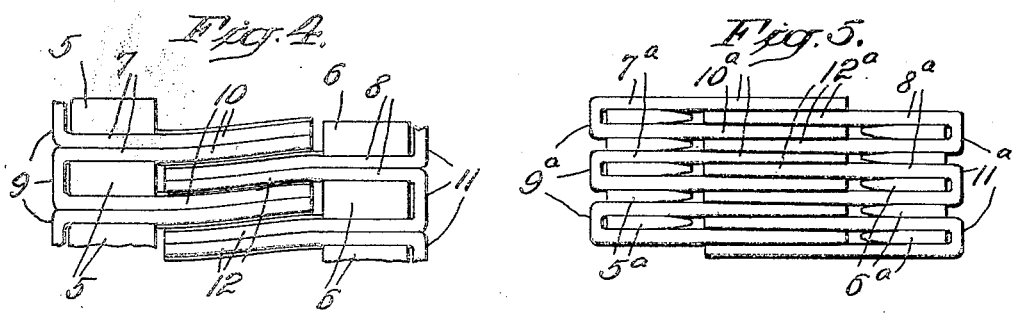
INVENTOR
JOHN J. SERRELL
BY Archibald Cox
ATTORNEY

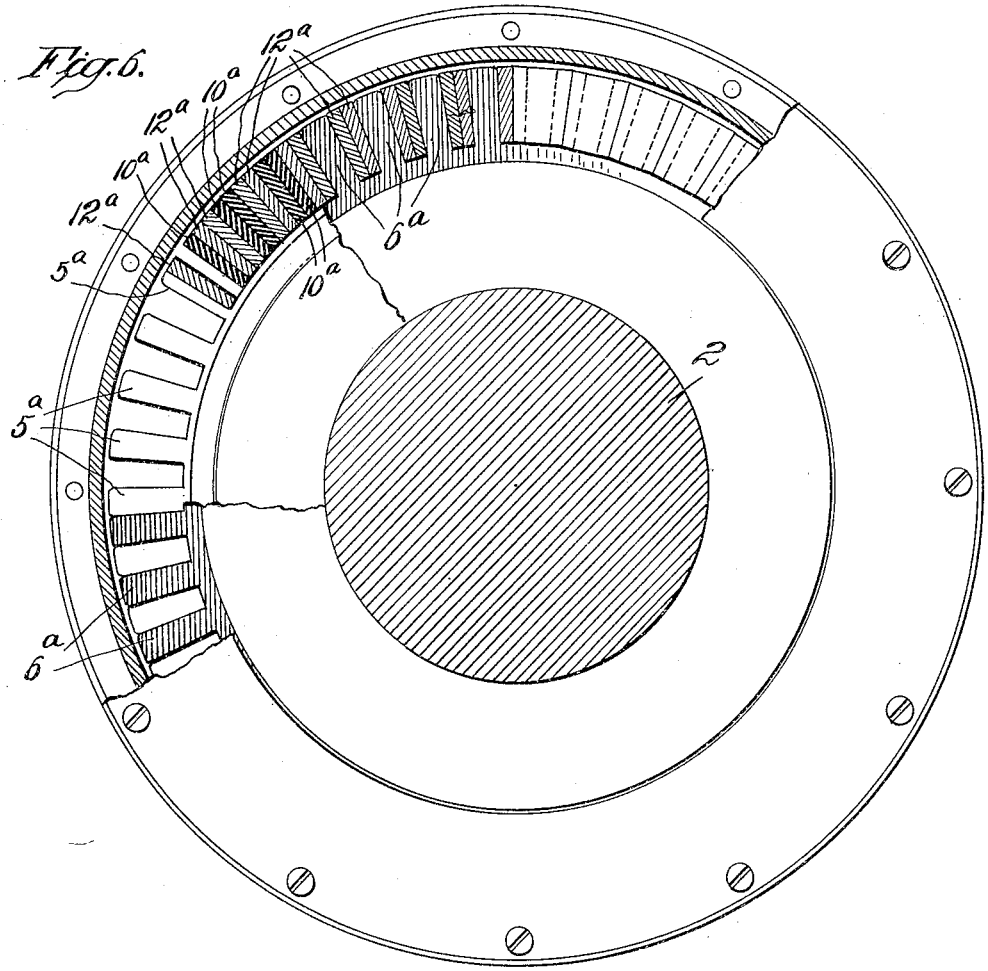
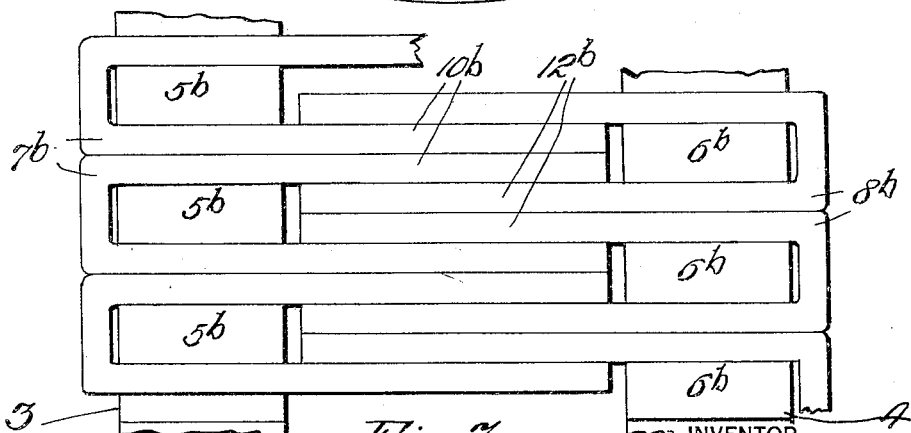

Patented July 26, 1932

1,868,544

UNITED STATES PATENT OFFICE

JOHN J. SERRELL, OF ELIZABETH, NEW JERSEY, ASSIGNOR TO SMITH & SERRELL, OF MAHWAH, NEW JERSEY, A COPARTNERSHIP CONSISTING OF ROBERT A. SMITH AND JOHN J. SERRELL

FLEXIBLE COUPLING

Application filed November 26, 1930. Serial No. 498,208.

This invention relates to flexible couplings adapted to effect a power transmitting connection between two rotary members, such, for example, as two substantially coaxial shafts, either one of which may be the driving member and the other the driven member. In installations of machinery where such rotary members are positioned end to end, it is substantially impossible to obtain exact alignment, for example, either as to eccentricity of the adjacent ends or angular relation between the axes of said members. If the ends of the rotary members are rigidly connected where they are out of alignment, the mechanism will be subjected to heavy stresses and abnormal wear; but, if the rotary members are connected with a suitable flexible coupling, the coupling will act not only to compensate for lack of alignment but also to provide for a resilient or cushioning action between the two rotary members or shafts.

The present invention relates more particularly to the type of flexible couplings in which two main coupling members fixed, respectively, on the adjoining ends of the two shafts are connected by members extending in directions generally parallel to the axes of the shafts, the connection between the main coupling members being such as to permit parts thereof to move toward and from each other during the revolutions of the shafts. To afford greater flexibility to the coupling, the members connecting the main coupling members may be of suitable resilient or spring quality. In general, in flexible couplings of this sort, either torsional strength or flexibility must be sacrificed at the expense of the other.

The main object of the present invention is to provide an improved flexible coupling which possesses not only great strength but also a substantial degree of flexibility. Other objects and advantages will appear upon consideration of the following detailed description and of the drawings, in which:

Fig. 3 is a longitudinal section taken along the line 3—3 of Fig. 2;

Fig. 4 is a diagrammatic view illustrating the yielding action of the connecting members;

Fig. 5 is a diagrammatic view of a modified form of coupling;

Fig. 6 is a view similar to Fig. 1 but illustrating a third embodiment of the invention; and Fig. 7 is a view similar to Fig. 2 but is of the structure illustrated in Fig. 6.

According to the illustrated forms of the invention, there are main coupling members secured to the adjacent shaft ends to rotate therewith and provided with teeth arranged around the peripheries thereof, and the connection between the main coupling members is effected by U-shaped members embracing said teeth and projecting from the coupling member on which they are supported toward the other coupling member, the portions of said U-shaped members projecting from the main coupling members engaging with each other and thereby constituting a torque transmitting connection.

Figure 1:
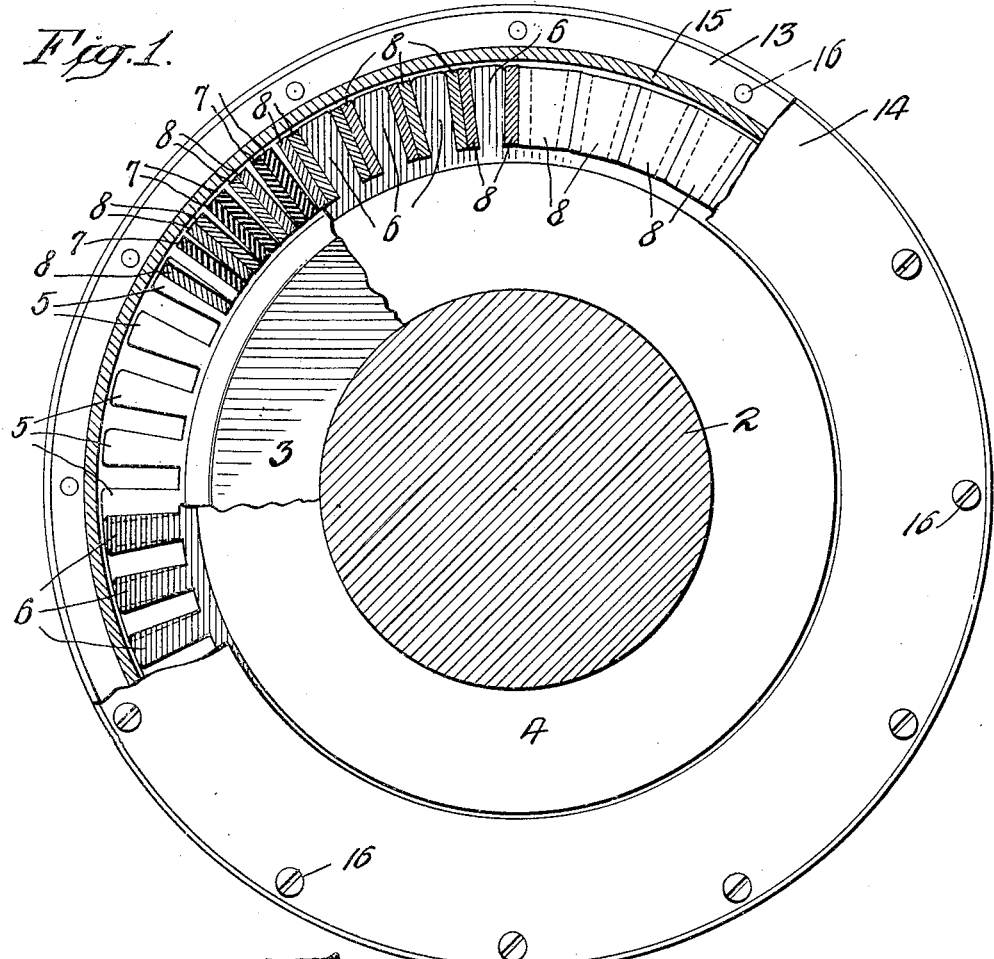
Fig. 1 is an end view partly in elevation and partly in section of one embodiment of the coupling, and portions being broken away to show the underlying structure.
Figure 2:
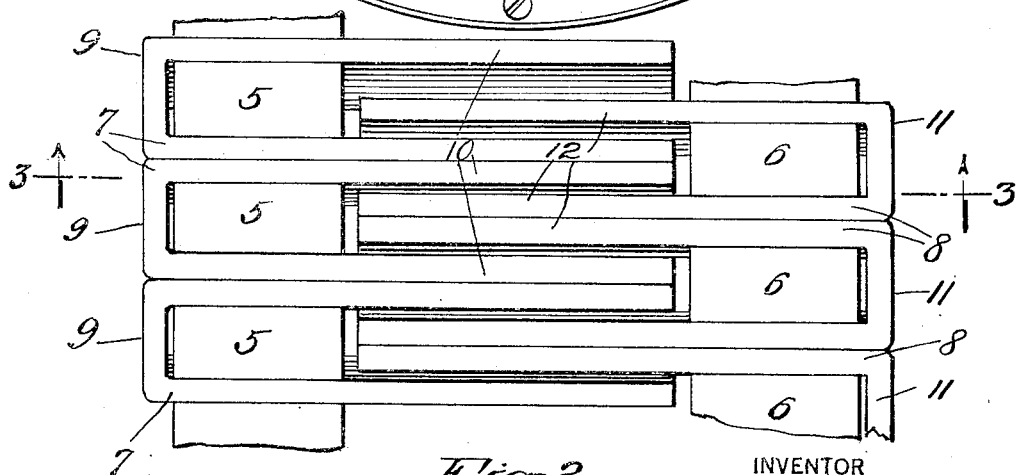
Fig. 2 is a fragmentary view of the periphery of the coupling shown in Fig. 1, the casing being removed.

Referring to the drawings, 1 and 2 indicate respectively two rotary members or shafts between which a driving or torque transmitting connection is to be established, and these shafts are provided at their adjoining ends with coupling members 3 and 4, respectively, which as here shown are similar to each other. The coupling member 3 is provided with a peripheral set of teeth 5 on which are mounted U-shaped connecting members or springs 7 of which the legs project toward the coupling member 4, and similarly the coupling member 4 is provided with a peripheral set of teeth 6 on which are mounted U-shaped connecting members 8 projecting towards the coupling member 3. As shown most clearly in Fig. 1, the teeth 5 and 6 are formed so that the notches therebetween have substantially radial sides. Also, as shown in Figs. 1 and 2, the notches are of a width corresponding to twice the thickness of the legs 10 of the U-shaped members 7 or the legs 12 of the members 8. Each of the teeth 5 and 6 is, however, thicker at the top than at the bottom and consequently the bases 9 of the members 7 and the bases 11 of the members 8 are trapezoidal rather than rectangular in shape and the planes of the legs of each U-shaped member are inclined accordingly. It will be evident that with teeth and U-shaped connecting members shaped in this way the connecting members will be held against movement toward the axes of the connecting members 3 and 4.

The teeth 5 and 6 are also of such width that two adjacent legs 10 of adjacent members 7 will fit between the legs of a member 8 and vice versa two adjacent legs 12 of members 8 will fit between the legs of a member 7. Due to the shape and arrangement of the teeth the planes of the legs 10 and 12 will be inclined to each other as indicated in Fig. 2. Obviously the sets of teeth 5 and 6 should be placed far enough apart to enable the use of legs 10 and 12 of sufficient length to give the desired degree of flexibility.

The coupling structure thus far described may be provided with a suitable grease casing such as indicated in Figs. 1 and 3 and including an annular flanged head 13 extending around the member 3, an annular flanged head 14 extending around the member 4, and a cylindrical intermediate portion 15 having at its edges flanges to which the heads 13 and 14 are secured by screws 16. Obviously, the heads 13 and 14 prevent any substantial movement of the bases of the U-shaped members away from the teeth 5 and 6.

In Fig. 5, there is illustrated another form of connection in which are used teeth 5a and 6a so spaced as to receive only one leg of a U-shaped connecting member between two successive teeth, the teeth being tapered at their inner edges thereby avoiding too abrupt bends in the legs of the U-shaped members. As in the first form there is a set of U-shaped members 7a having bases 9a and legs 10a and a set of corresponding members 6a having bases 11a and legs 12a. In this form of coupling the U-shaped connecting members 7a are placed only over alternate teeth 5a and the members 8a are placed over alternate teeth 6a, and there is only one leg of a U-shaped member of one set between the legs of a U-shaped member of the other set.

In Figs. 6 and 7, there is illustrated a third form of the invention which is similar to the structure illustrated in Figs. 1 and 2 but differs therefrom in various respects including the features of providing teeth 5b and 6b on the coupling members 3 and 4, respectively, with the faces at opposite sides in radial planes, thus forming what may be called wedge-shaped notches or gaps between the teeth; and of U-shaped connections 7b and 8b of such wedge-shaped section that they fit closely in the notches and the legs 10b and 12b fit closely against each other between the coupling members 6 and 7.

It should be understood that various changes may be made in the construction and arrangement of parts and that certain parts may be used without others without departing from the true scope and spirit of the invention.

I claim:—

1. In a flexible coupling, the combination of two coupling members arranged side by side, and means for connecting said coupling members including a peripheral set of teeth on one of them, U-shaped springs embracing said teeth and arranged with their sides projecting toward but not reaching the other coupling member, and means on said other coupling member to cooperate with said sides of the U-shaped members.

2. In a flexible coupling, the combination of two coupling members arranged side by side and each provided with a peripheral set of teeth, and means for connecting said coupling members including spring devices embracing the teeth of the two sets and providing legs projecting from each of the sets of teeth toward the other, the legs projecting from each set of teeth lying between legs projecting from the other set of teeth.

3. In a flexible coupling, the combination of two coupling members arranged side by side and each provided with a peripheral set of teeth, and two sets of U-shaped springs, each spring embracing a tooth, the free ends of the legs of one set of springs overlapping the free ends of the other set of springs, the adjacent legs of two successive springs of one set fitting between the legs of a spring of the other set.

4. In a flexible coupling, the combination of two coupling members arranged side by side and each provided with a peripheral set of teeth, and two sets of U-shaped springs, each spring embracing a tooth, the legs of one set of springs projecting between the legs of the other set of springs.

5. In a flexible coupling, the combination of two coupling members arranged side by side and each provided with a peripheral set of teeth, each tooth increasing in thickness from the base to the outer end thereof, and two sets of cooperating U-shaped springs, a U-shaped spring embracing each tooth and fitting against the sides thereof, the legs of one set of springs projecting between the legs of the other set of springs.

6. In a flexible coupling, the combination of two coupling members arranged side by side and each provided with a peripheral set of teeth, and U-shaped springs embracing alternate teeth of both set and arranged with each leg of each spring on one set of teeth fitting between the legs of a spring on the other set of teeth.

7. In a flexible coupling, the combination of two coupling members arranged side by side and each provided with a circular set of radially arranged members, and a U-shaped spring embracing each tooth of each set, the legs of the springs extending from the corresponding coupling member toward the other coupling member and projecting between the spring legs projecting from the other coupling member.

8. In a flexible coupling, the combination of two coupling members arranged side by side and each provided with a peripheral set of teeth and notches between successive teeth, each notch having parallel sides at equal distances from a central radial plane, and a U-shaped spring embracing each tooth and fitting against the sides thereof, the legs of one set of springs projecting between the legs of the other set of springs and engaging them at their inner edges.

9. In a flexible coupling, the combination of two coupling members arranged side by side and each provided with a peripheral set of teeth having their pressure exerting faces lying substantially in radial planes, and a U-shaped spring embracing each tooth and fitting against the sides thereof, the legs of one set of springs projecting between the legs of the other set of springs and said legs being of wedge-shaped cross section to fit closely between successive teeth and against each other between the two sets of teeth.

JOHN J. SERRELL.